United States Patent [19]

Danielsen et al.

[11] Patent Number: 4,996,028
[45] Date of Patent: Feb. 26, 1991

[54] TRICKLE VALVE

[75] Inventors: Arvid M. Danielsen, Sparta; Donald F. Shaw, Denville, both of N.J.

[73] Assignee: Exxon Research and Engineering Company, Florham Park, N.J.

[21] Appl. No.: 310,985

[22] Filed: Feb. 15, 1989

[51] Int. Cl.5 .................... F27B 15/02; F16K 15/03
[52] U.S. Cl. .................................. 422/147; 422/144; 422/145; 422/310; 137/527.6; 137/527.8
[58] Field of Search ............... 422/310, 147, 144, 145; 137/527.6, 527.8

[56] References Cited

U.S. PATENT DOCUMENTS

| | | | |
|---|---|---|---|
| 608,450 | 8/1898 | Godfrey | 137/527.6 |
| 2,838,063 | 6/1958 | Weits et al. | 137/527.6 |
| 2,838,065 | 6/1958 | Heid et al. | 137/521 |
| 2,882,923 | 4/1959 | Smolensky | 137/527.8 |
| 3,976,286 | 8/1976 | Thompson et al. | 428/469 X |
| 4,074,691 | 2/1978 | Luckenbach | 137/382 |
| 4,246,231 | 1/1981 | Figler et al. | 422/147 |

Primary Examiner—Robert J. Warden
Assistant Examiner—Jeffrey R. Snay
Attorney, Agent, or Firm—Joseph J. Dvorak

[57] ABSTRACT

An improved trickle valve is provided which includes a curved tubular body portion terminating at its bottom end with a valve seat. The trickle valve also includes a flapper plate which is pivotably mounted to cover the valve seat when the valve is in the closed position and which swings away from the valve seat when the valve is in the open position. Importantly, the tubular body portion has a predetermined radius of curvature sufficient to increase, under conditions of use, the stability of the dipleg solids level over that of trickle valves having a straight run tubular body portion. Indeed, the radius of curvature of the tubular body portion preferably is in the range of from about 1½ times to 2½ times the diameter of the tubular body portion.

9 Claims, 1 Drawing Sheet

TRICKLE VALVE

FIELD OF THE INVENTION

This invention relates to trickle valves. More particularly, this invention relates to trickle valves used in fluid-solids contacting zones and especially in dilute phase fluid solids contacting zones.

BACKGROUND OF THE INVENTION

There are many chemical and petroleum processes in which solid particles of fluidizable size are suspended in a gas during reaction conditions. One example of such processes is the fluidized catalytic cracking of petroleum. In this process, a petroleum feedstock is contacted with a solid catalyst at temperatures in the range of about 480° C. to about 800° C. In the past, the catalyst particles in a fluidized catalytic cracking process were maintained in a reactor in a dense fluidized state or bed. More recently, the trend has been to conduct fluidized catalytic cracking of petroleum without the maintenance of a dense fluidized bed of catalyst particles. Instead, the solid catalyst is suspended as a dilute phase in a fluid which is passed through the reactor vessel at sufficiently high velocities so that the reactants pass rapidly through the hydrocarbon conversion zone. This procedure reduces the residence time of the reactants in the hydrocarbon conversion zone to a predetermined time which is a function of catalyst activity, temperature, nature of the feed and the like. In effect, it permits use of higher activity catalyst and higher temperatures than previously practical.

In all of these processes, fluid reactors, regenerators and similar vessels must be provided with means for separating the solid particles from the gaseous phase. Typically, this is accomplished by cyclones located in the upper part of the vessel. The solids separate from the gaseous fluid in this cyclone are returned to the fluid solids contacting zone by the cyclone dipleg.

For cyclones to operate efficiently, it is necessary to prevent the ingress of fluidizing gas into the dipleg of the cyclone. Trickle valves have been used for this purpose. Basically, these consist of an angularly oriented conduit having one end operably connected to the dipleg of the cyclone and a hinged flapper or closure plate at the opposite end for opening and closing the conduit. Examples of these trickle valves can be found in U.S. Pat. Nos. 2,838,062; 2,838,065; 2,901,331; 3,698,874; 4,246,231; and 4,446,107.

These references evidence the fact that satisfactory operation of trickle valves has always been a problem. Recent experience, moreover, has shown that achieving satisfactory performance of trickle valves in dilute phase fluid solids contacting zones is even more difficult. Thus, it is an object of the present invention to provide an improved trickle valve. Indeed, it is an object of the present invention to provide an improved trickle valve suitable especially for use in fluid solids contacting zones, particularly dilute phase fluid solids contacting zones.

SUMMARY OF THE INVENTION

Accordingly, an improved trickle valve is provided which includes a curved tubular body portion terminating at its bottom end with a valve seat. The trickle valve also includes a flapper plate which is pivotably mounted to cover the valve seat when the valve is in the closed position and which swings away from the valve seat when the valve is in the open position. Importantly, the tubular body portion has a predetermined radius of curvature sufficient to increase, under conditions of use, the stability of the dipleg solids level over that of trickle valves having a straight run tubular body portion. Indeed, the radius of curvature of the tubular body portion preferably is in the range of from about 1½ times to 2½ times the diameter of the tubular body portion.

In one embodiment of the present invention, the valve seat is oriented at an angle of from about 3° to about 5° from the vertical.

In another embodiment, the flapper valve has a refractory coating on both of its faces.

Additional features and advantages of the trickle valve of the invention will become apparent upon reading of the detailed description of the invention in light of the accompanying drawings.

DETAILED DESCRIPTION OF THE DRAWINGS

For convenience, the present invention will be described in particular detail with respect to a reactor containing a single cyclone having the valve of the present invention attached to the dipleg of the cyclone. However, it will be readily appreciated that fluid solids contacting apparatus like fluid catalytic cracking reactor units, contain a plurality of cyclones located within the vessel and the present invention is particularly suitable for use in those units.

Figure 1:
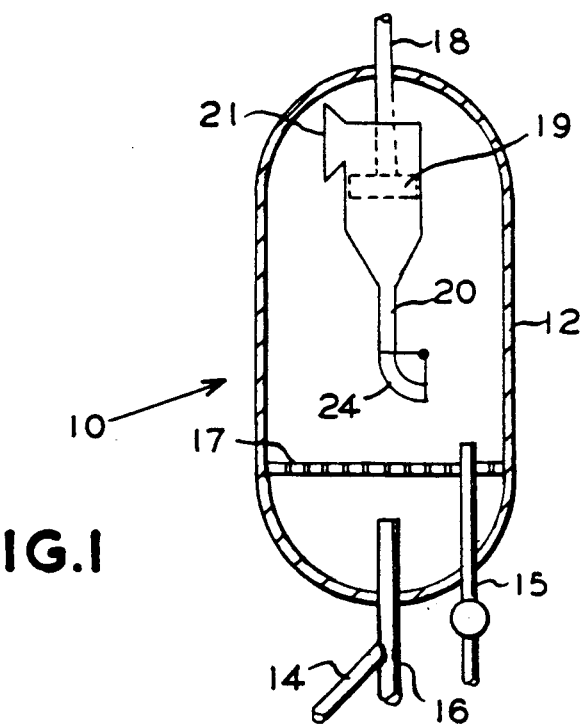
FIG. 1 is a vertical section of a vessel having a cyclone positioned within the vessel to which the flapper valve of the invention is attached.

Referring initially to FIG. 1, a fluid solids contacting vessel 10 includes a shell 12 which is provided with an inlet 16 for introducing entrained solids, such as catalyst suspended in a fluidizing gas, into the bottom of the vessel 10. A conduit 14 is also provided for introducing a fluid reactant into the bottom of vessel 10. Additional inlets as may be necessary can be provided. In the embodiment shown in FIG. 1, a distributor plate 17 is horizontally disposed in the vessel 10 above the inlet conduits 14 and 16 for uniformly distributing the reactants in the vessel. The distributor plate 17, however, is totally optional. It may be left out or other known distributing devices may be employed. Also shown in FIG. 1 is a conduit 15 for removal of solids from the vessel.

A gas outlet 18 is provided at the top of the vessel 10. As can be seen, the gas outlet 18 is operably connected to a cyclone 19 which has a gas solids inlet 21 and a dipleg 20. Entrained solids that enter through the inlet 21 are returned to the vessel via dipleg 20 and gaseous product is removed from the vessel via conduit 18. As can be seen, the trickle valve 24 of the present invention is located at the lower extremity of dipleg 20.

Figure 2:
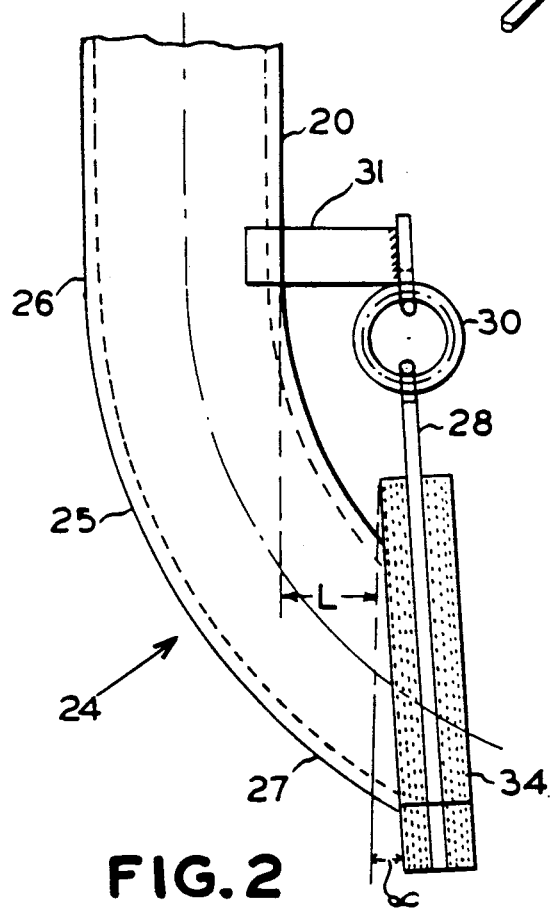
FIG. 2 is a detailed side elevation of the trickle valve of the present invention.
Figure 3:
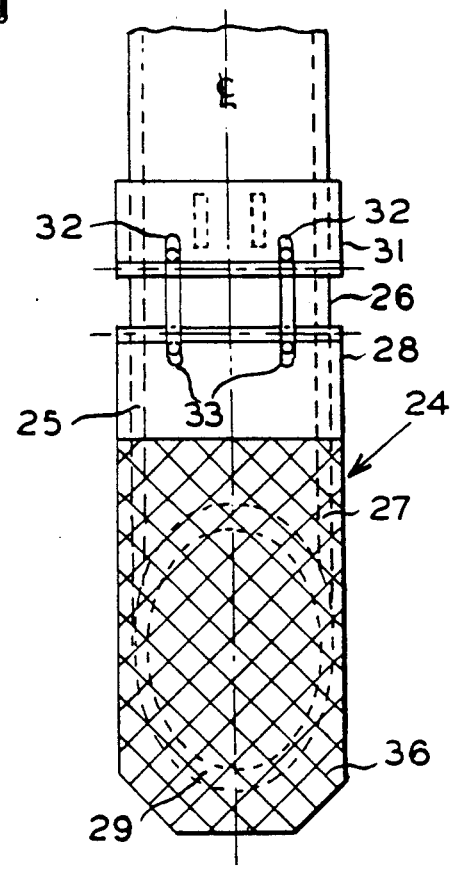
FIG. 3 is a detailed front elevation of the trickle valve of the present invention.

Referring now to FIGS. 2 and 3, trickle valve 24 includes a tubular body member 25, in the form of a curved elbow having a first or top end 26 for operably connecting the valve 24 to the dipleg 20 of the cyclone. The body portion 25 of the trickle valve 24 can be attached to dipleg 20, for example, by means of welding. Body member 25 also has a second or bottom end 27. The face 29 of the opening at end 27 of the valve defines a valve seat.

Importantly, the tubular body portion 25 of valve 24 has a predetermined radius of curvature sufficient to increase, under conditions of use, the stability of the dipleg solids level over that of trickle valves having a straight run tubular body portion. Indeed, the radius of curvature of the tubular body portion 25 preferably is in the range of from about 1½ times to about 2½ times the diameter of the tubular body portion 25.

In a preferred embodiment of the present invention the valve seat, or face 29, is oriented at an angle, α, with respect to the vertical, whereby the bottom of the valve seat extends outwardly farther than the top of the valve seat. This is shown in FIG. 2. Preferably, the valve seat is oriented at an angle of from about 3° to about 5° from the vertical.

Preferably, the length of the tubular body portion 25 is selected so that valve seat 29 is spaced, as shown in FIG. 2, at a horizontal distance, L, from the top of the curved body portion, which distance is in the range of from about ¼ to about ⅜ of the diameter of the tubular body.

The trickle valve 24 includes a flapper plate 28 which is pivotably mounted so as to engage the valve seat 29 at the lower end 27 of the body 25. As shown, a pair of "O" shaped hinges 30 which depend from a T-shaped bracket 31 are used to pivotably mount the flapper plate 28 so it is positioned to engage the valve seat 29 when the valve is closed. As can be seen, the T-shaped support bracket 31 has a pair of openings 32 that are larger in diameter than the diameter of the rod used to make the "O" shaped rings 30. Flapper plate 28 has a corresponding pair of openings 33 which have a diameter greater than the diameter of the rod used to make the "O" rings 30. The "O" rings 30 are inserted through the openings in the T-shaped support bracket 31 and through the openings 33 of the flapper plate 28.

The T-shaped support bracket 31 is shown as being mounted at the weld line of the dipleg 28 and the upper portion 26 of conduit 25. Location of the T-shaped support bracket, however, is not critical.

As shown in FIG. 2, the flapper valve 28 is provided with a refractory coating 34 on both faces of the flapper plate 28. It is particularly preferred that the refractory coating be an erosion resistant refractory such as phosphoric acid bonded alumina refractories. An example of such a refractory is the 90% alumina refractory sold by Resco Industries, Norristown, Pa. under the trade name Resco-AA-22. The refractory material preferably is hand poured onto the faces of flapper 28. The coating technique, of course, is not critical and any conventional refractory casting techniques may be employed.

In the practice of the present invention, it is particularly preferred to anchor the refractory to the surface of the flapper valve 28 by refractory anchors welded to the flapper valve. In FIG. 3, the anchor takes the form of a hexagonal steel grating shown schematically by the grid pattern 36.

As shown in FIG. 3, the width of flapper 28 is slightly larger than the diameter of the conduit 25 so that lateral movement of the flapper 28 does not result in opening of the valve.

A particular advantage of the double refractory lined flapper 28 of the trickle valve 24 of the present invention is that it is significantly heavier than conventional bare metal flappers and, as a consequence, provides a more stable dipleg solids level. The double refractory lined flapper 28 has other advantages. For example, the refractory on the flapper minimizes erosion of the flapper itself and provides a better sealing surface over a longer period of time. The refractory on both sides of the flapper 28 also minimizes thermal distortion of the flapper plate 28. Because the double refractory flapper is symmetrical, it simplifies the shimming and balancing of the flapper during installation and it also can be reversed at a future turnaround if erosion is significant. These and other advantages of the trickle valve of the present invention will be apparent to those skilled in the art.

What is claimed is:

1. A trickle valve comprising:
   a curved tubular body having a diameter, a radius of curvature, a first end and a second end, the radius of curvature of the tubular body being in the range of from about 1½ times to about 2½ times the diameter of the tubular body;
   a valve seat having a top end and a bottom end, the valve seat located at the second end of the tubular body;
   a flapper plate having two faces, the flapper plate having a refractory coating on each of the two faces thereof; and
   means for pivotably mounting the flapper plate whereby the plate engages the valve seat when the valve is in a closed position.

2. The valve of claim 1 wherein the valve seat, under conditions of use, is inclined at an angle of from about 3° to about 5° with respect to a vertical line extending downwardly from the top end of the valve seat.

3. The valve of claim 1 wherein the top end of the valve seat is at a horizontal distance from the first end of the tubular body closest to the valve seat of from about ¼ to about ⅜ the diameter of the tubular body.

4. The valve of claim 1 wherein the refractory coating is anchored to the flapper plate by means of a hexagonal steel grating that is welded to the flapper plate.

5. In a fluid solids contacting apparatus having at least one cyclone in the apparatus for gas-solids separation and including a trickle valve operatively connected to the dipleg of the cyclone for stabilizing the level of solids therein, the improvement wherein the trickle valve comprises:
   a curved tubular body having a first end connected to the cyclone and a second end defining a valve seat, the tubular body having a diameter, D, and a radius of curvature in the range of from about 1½ times to 2½ times the diameter, D, of the tubular body;
   a flapper plate having two faces; and
   means for pivotably mounting the flapper plate for one of the two faces to engage the valve seat when the valve is in a closed position and to disengage and move away from the valve seat when the valve is in an open position.

6. The improvement of claim 5 wherein the valve seat has a top end and a bottom end and, under conditions of use, is inclined at an angle of from about 3° to about 5° from a vertical line extending downwardly from the top end of the valve seat.

7. The improvement of claim 5 wherein the valve seat has a top end and a bottom end and the top end is horizontally spaced from the first end of the tubular body closest to the valve seat by a distance of from about ¼ to about ⅜ D.

8. The improvement of claim 5 wherein each of the two flapper plate faces have a refractory coating thereon.

9. A trickle valve comprising:
 a curved tubular body having a predetermined length, radius of curvature, and a diameter, D, the curved tubular body having a first end and a second end;
 the radius of curvature of the body being in the range of from about 1½ times to about 2½ times D;
 the second end of the body terminating in a valve seat;
 the valve seat having a top end and a bottom end;
 the length of the body being such that the top end of the valve seat is horizontally spaced from the first end of the tubular body closest to the valve seat by a distance of from about D/4 to about 3D/8;
 the valve seat being oriented, under conditions of use, at an angle in the range of about 3° to about 5° from a vertical line extending downwardly from the top end of the valve seat;
 a flapper plate having two faces, each of which has a refractory coating; and
 means for pivotably mounting the flapper plate whereby the refractory coating on one face engages the valve seat when the valve is in a closed position and disengages the valve seat when the valve is in an open position and whereby said flapper plate can be reversed so that the opposite face can engage and disengage the valve seat.

* * * * *